United States Patent [19]

Lerner

[11] 4,348,974
[45] Sep. 14, 1982

[54] CLEAT

[76] Inventor: Michael Lerner, 7 Holyoke St., Boston, Mass. 02116

[21] Appl. No.: 105,554

[22] Filed: Dec. 20, 1979

[51] Int. Cl.³ .............................................. B63B 21/04
[52] U.S. Cl. ................... 114/218; 24/115 F; 254/391
[58] Field of Search ............... 114/213, 215, 217, 218, 114/204, 205; 24/115 L, 115 F, 115 R, 118, 127; 254/391, 392, 396, 398, 371; 188/83, 72.8, 65.1; 24/132 R, 249 R, 134 R; 104/231, 229, 202

[56] References Cited

U.S. PATENT DOCUMENTS

| 3,580,209 | 5/1971 | Olson | 114/218 |
| 4,054,265 | 10/1977 | Magg et al. | 254/371 |
| 4,084,532 | 4/1978 | Feder | 114/218 |

FOREIGN PATENT DOCUMENTS 474003 8/1952 Italy .................... 24/115 L

Primary Examiner—Robert B. Reeves
Assistant Examiner—Douglas D. Watts
Attorney, Agent, or Firm—Thomas J. Engellenner

[57] ABSTRACT

A cleat comprising a base plate and two dome-shaped high-friction surfaces, which secure a line or rope therebetween, the domes are connected to a ratchet which permits each dome to rotate in only one direction and the ratchets are arranged so that the domes rotate in opposing directions, drawing the line in and preventing the line from being withdrawn without manual release action. An adjustable tension head caps each dome and the domes float on low-friction washers, permitting limited and controlled line slippage whenever a pre-set line tension is exceeded. In another embodiment, eliptical collars and spring-loaded collar pieces surround the dome shafts to permit easy insertion of lines and provide an adjustment for different diameter lines.

12 Claims, 4 Drawing Figures

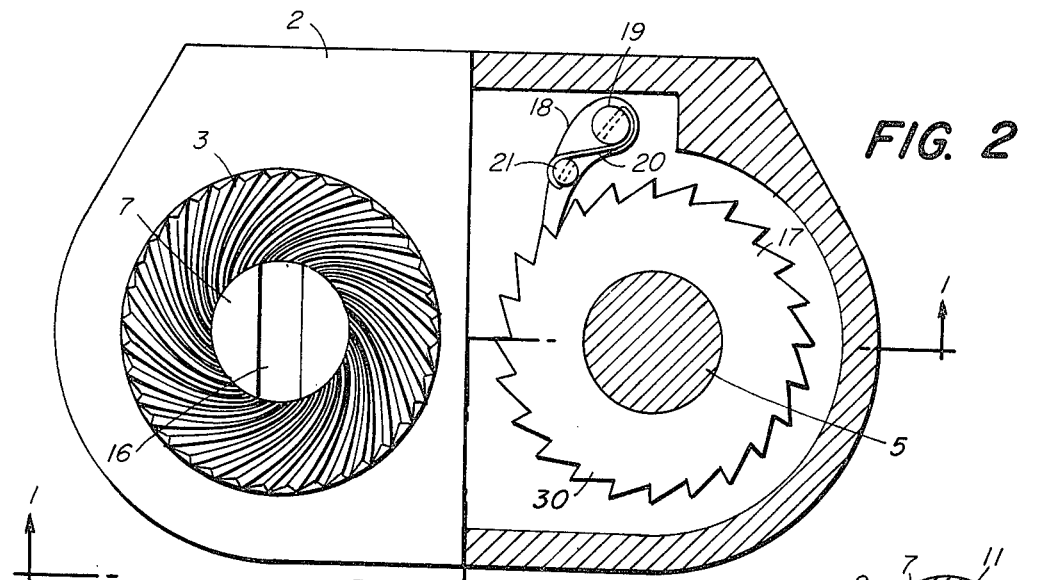
FIG. 2
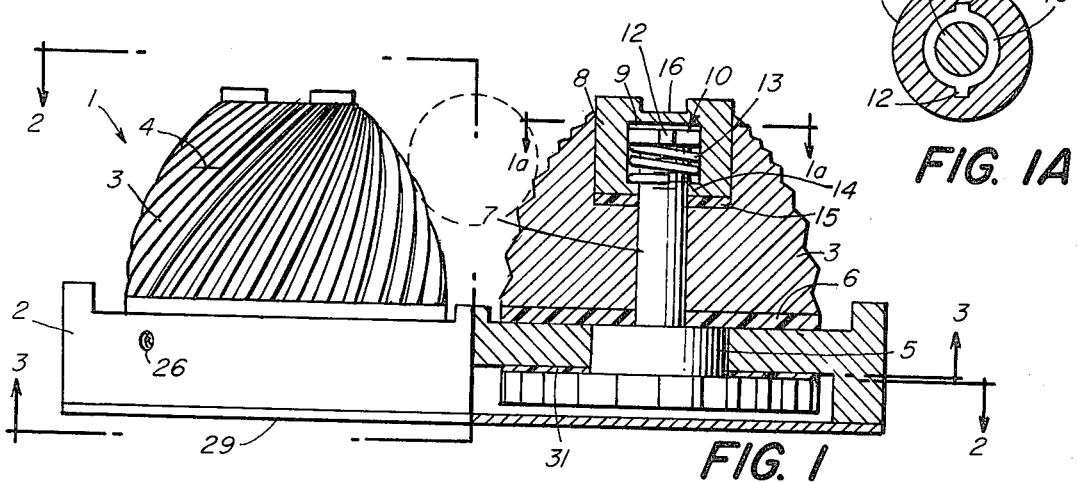
FIG. 1A
FIG. 1
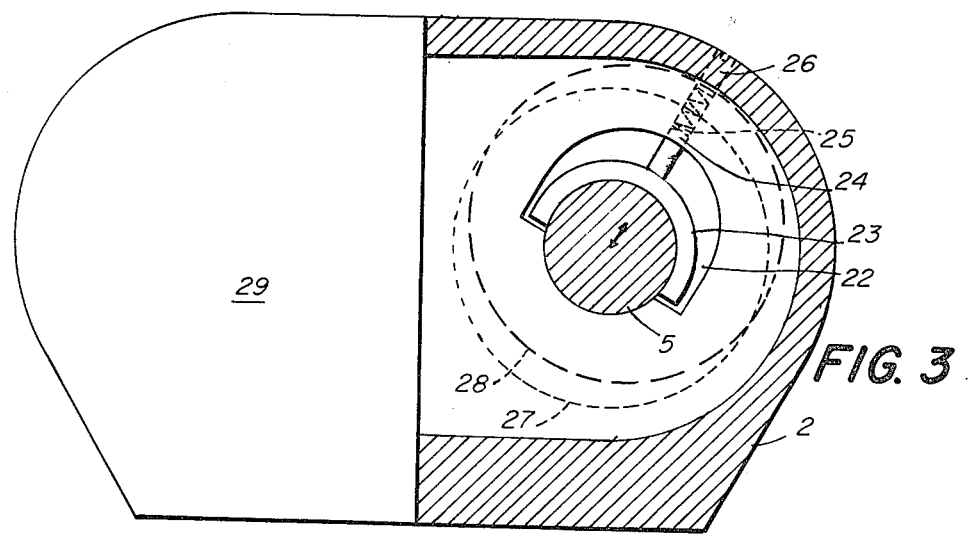
FIG. 3

CLEAT

BACKGROUND OF THE INVENTION

Cleats are used in many applications where it is necessary to secure lines or ropes. In small boat sailing, a particular type of cleat is commonly used to secure the jib sheet and main-sheet. In these applications, the cleat has traditionally permitted the lines to move in one direction while preventing movement in the other direction. A locking cleat or mooring plate will not suffice because they do not permit the sailor to draw rapidly in the lines, as is needed for continual adjustment of sail trim, nor to release the lines quickly enough to prevent capsize.

Conventionally, the solution to this problem has been to use what is commonly referred to as a pivoting cam cleat. For example, typical cam cleats of various designs are shown in U.S. Letters Pat. Nos. 3,265,032 issued Aug. 9, 1966; 3,730,129 issued May 1, 1973; and 4,084,532 issued Apr. 18, 1978. Essentially a cam cleat comprises a pair of spring-biased cam elements, or a single spring-biased cam element and an abutment that cooperate with each other to receive a line therebetween. The eccentricity of the cams is such that drawing a line in one direction causes the gap between the elements to widen and thus, the line to draw smoothly, while drawing the line in the opposite direction allows the gap to close and the line to be secured.

When a conventional cam cleat is used, difficulties are sometimes encountered, because, in order to release a locked line, a sailor must pull opposite the force exerted by the wind on the sail. Once the gap between the cam elements has been widened sufficiently by drawing in the line, the sailor may lift the line from the cleat and manually release it. However, in a strong wind, this task can be difficult to perform in time to prevent capsize. Another problem with conventional cam cleats occurs when the springs weaken or stick as a result of corrosion or salt. In these instances where the cams do not pivot freely, the cam cleat may not "lock" on the line unless it is closed manually.

Additionally, cam cleats suffer the deficiency of having no means to permit a limited release of line when a certain line tension is exceeded. Such a feature would obviously be of value in counteracting the sudden gusts of wind that sometimes cause even the experienced sailor to heel dangerously and the inexperienced sailor to capsize.

SUMMARY OF THE INVENTION

My invention relates to an improved cleat and a method for securing lines. In particular, my invention concerns an improved cleat for use on sailboats, the cleat having high-friction domed surfaces which engage sailboat lines therebetween.

It has been discovered that a cleat comprising a baseplate and two dome-shaped, high-friction surfaces, arranged in a close but non-contacting relationship, may be used advantageously to overcome the problems of prior art sailboat cleats when the domed surfaces are so arranged as to snugly grip both sides of the line. When the domes are connected to a ratchet or other mechanism which permits one-way rotation only, an improved cleat is created. In addition to providing a means for shortening and securing rigging lines, the dome-shaped high-friction surfaces are designed to overcome the difficulties encountered in manually releasing lines after they are secured. Because the domes do not "jam" the line against an eccentric element, the sailor can more easily lift the line from the cleat and thus release it.

It has also been found that the dome shape of the cleat not only facilitates easy manual release, but also permits easier line insertion as well. Because the two domes define an arching inclined opening therebetween, it is easier for the sailor to pull the line up and out to release it, and conversely, to pull the line down and in to admit the line to the cleat. In one embodiment, the domes are characterized by spiralling grooves as a high-friction surface. As the domes rotate and admit the line, the spiralling grooves or other line engaging means on the domes serve to draw the line towards the bottom of the domes and hold it tightly in the cleat. The domes typically have the same or similar surfaces, but may have different line engaging surfaces if desired.

Another aspect of this invention is a simple, new means for permitting limited slippage of secured lines in cases where a sudden gust of wind causes the tension on a line to exceed a preset level. In this aspect of the invention, the dome-shaped, high-friction surfaces which define the cleat rotate on low-friction washers so that they may rotate backwards, even though the ratchet mechanism locks the shafts in place. By combining these low-friction washers with a tightening head, the tension level at which slippage occurs can be adjusted and set. A spring-loaded floating cap nut is incorporated into the tightening head to insure that the preset tension level is not altered by line slippage.

A further aspect of the invention is a novel means for adjusting the distance which separates the two dome-shaped high-friction surfaces so as to permit the cleat to admit lines of varying diameters. Additionally, the means disclosed serves to make it yet easier to insert any given diameter line. This embodiment comprises an elliptical shaft collar and spring-loaded collar piece which surround each dome shaft, so that the domes are forced into a tight gripping relationship with the rope by the action of the spring-loaded collar piece. The collar, formed by the elliptical shaft opening and collar piece, may be tightened or loosened by a set screw which holds the spring against the collar piece.

Thus, the improved cleat disclosed herein provides an improvement in the ease and simplicity of shortening and securing lines, particularly sailboat lines, as well as releasing such lines. Additionally, in one embodiment, it contains features which permit limited and controlled slippage and in another aspect, it facilitates line insertion and compensates for variations in line diameter. My improved cleat will be described and illustrated in connection with an embodiment which contains all the features described above. In another embodiment, the direction of the ratchetted rotation can be altered at will thus enabling a single "dome-cleat" to replace the pair of conventional cleats traditionally used to handle jib sheets. Ratchets which can be easily re-set to reverse their direction already exist in several forms which can readily be applied to the form of the invention described herein. However, it should be recognized that my invention also may be practiced in its simplest form; as a cleat consisting essentially of only the base plate, domes and ratchet means, and still provide the user with significant improved performance over the conventional cam cleat.

It should also be recognized, by those persons skilled in the art, that various changes and modifications may be made in the embodiments of my improved cleat, as described and illustrated, without departing from the spirit and scope of my invention. For example, the preferred embodiment reveals spiralling grooves on the domed surfaces as a means to provide the domes with high-friction surfaces. Other surface textures, such as knurls, points or ripples, formed by molding, etching or impressing, can also be used to provide the domes with high-friction surfaces. In some applications, where it is preferred that the line remain very firmly in place in the cleat, the domes of my invention may be slightly undercut at their bases.

Further, it is noted that my invention may be practiced with a single dome which forces a line tightly against a plate or bitt, however, it is believed that the two-dome configuration is preferred because of its symmetry, greater strength and precision.

It should also be noted that, although in one embodiment a ratchet wheel and pawl are shown to permit only one-way rotation of the domes, roller ratchets or other means to permit only one-way rotation may be used interchangeably with the toothed wheel and pawl means.

BRIEF DESCRIPTION OF THE DRAWINGS

FIG. 1 is a partial, sectional an elevational side view of my improved cleat.

FIG. 1a is a sectional view along line 1a of FIG. 1 of the tightening head.

FIG. 2 is a partial, sectional top view along lines 2—2 of FIG. 1.

FIG. 3 is a partial, sectional bottom view along lines 3—3 of FIG. 1.

DESCRIPTION OF THE EMBODIMENTS

FIG. 1 shows a cleat 1 is formed by a base plate 2 and two domes 3 to secure a line (shown in dotted lines in FIG. 1). The domes 3 are formed with high-friction, spiralling, grooved, external surfaces 4. The domes 3 surround a thread post 7, which post 7 is formed as an integral part of a shaft 5. The shaft 5 passes through the base plate 2. Washers 6 separate the domes 3 from the base plate 2.

As can be seen in the cut-away portion of FIG. 1, the domes 3 are not secured directly into the threaded post 7. Instead, the domes 3 each carry a central annular recess into which a tightening head 8 and head washer 15 are fitted. As will become evident, the arrangement of the dome and tightening head serves to permit the domes to rotate by slippage at the washers 6 and 15, even if the shafts 5 are locked in place.

The tightening head is constructed as particularly shown in FIG. 1a so as to have a hollow head cavity 9. The cavity 9 is partially closed by a head cavity lip 14. Within the head cavity 9 and threaded about the threaded post 7 is a floating cap nut 10 with externally protruding pins 12. The pins 12 are received in slots 11 formed in the head cavity 9. By this arrangement the cap nut 10 may move up and down within the cavity but is fixed to the tightening head 8 for purposes of rotation therewith. A compressible spiral wound spring 13 is situated within the head cavity 9 and around the threaded post 7. One end of spring 13 abuts the cap nut 10, while the other end abuts the inside of the head cavity lip 14. By this arrangement, tightening of the cap nut 10 compresses the spring 13. Compression of the spring 13 serves to bind the cap nut 10 firmly to the threaded post 7, thus preventing rotation of the dome 3 from causing alteration of a given pre-set tension adjustment of the tightening head.

By means of the tightening head 8 and the assembly within the head cavity 9, the domes 3 may be adjusted to ride loosely or snugly on the washers 6 and 15 and will retain the desired adjustment through prolonged use. The tightening head 8 carries a slot 16 by which it may be tightened or loosened with any suitably shaped tool.

The ratchet mechanism of my cleat is shown in FIG. 2. The shaft 5 which is integral with the threaded post 7 (discussed above) passes through the base plate 2. Beneath the base plate 2, the shaft 5 is joined to a ratchet wheel 17, having teeth 30. The teeth 30 of the wheel 17 are designed to engage a pawl 18. The pawl 18 rotates about a post 19 which is fixed securely to the base plate 2. The pawl 18 is urged upon the teeth 30 of the ratchet wheel 17 by means of a band spring 20 which is attached to the fixed post 19 at one end and a spring attachment post 21 on the pawl 18 at its other end. Washers 31 separate the ratchet wheels 17 from the base plate 2.

The arrangement of the ratchet wheel 17 and pawl 18 is such that the shaft 5, and consequently the domes 3, may rotate freely in one direction and lock against rotation in the other direction. The configuration of the teeth 30 and the pawl assembly 19–21 on the other shaft (not shown) is a mirror image of the configuration shown in the cut-away portion of FIG. 2. In this manner the domes 3, which are secured to the shaft 5 as described previously, may cooperate to draw a line into the cleat 1 and secure the line once it is drawn into the cleat 1. The ratchet mechanism may be protected from the outside environment by a base plate cover 29 as shown in FIG. 3.

My cleat is also shown in FIG. 3. Each shaft 5 passes through an elliptical hole 22 in the base plate 2. The elliptical holes 22 permit a certain amount of variability in the distance which separates the two domes 3. A "U"-shaped (semi-circular) collar piece 23 is situated in the elliptical hole 22 concentric with the curvature of the hole 22 and having a stem which fits into a threaded hole 24. The threaded hole 24, which communicates with the external surface of the base plate, is fitted with a compressible helical spring 25 and a set screw 26, such that when the set screw 26 is tightened into the threaded hole 24, the "U"-shaped collar piece 23 is urged against the shaft 5 and the domes 3 are thus placed in a close relationship in order to maximize the gripping action of the high-friction surfaces 4 regardless of the diameter of the line.

The position of maximum flexure of the dome 3 is shown by the dotted circular base line 28 and the normal operating position is shown by line 27. This aspect of the invention permits the cleat to function well with lines of varying diameters as well as make it easier to insert any given size lines. The amount of variability of the domes 3 and shafts 5 is varied by tightening or loosening the set screw 26.

In operation my cleat 1 is used by securing the baseplate 2 to the sailboat. The sheets of the boat may then be secured by drawing the lines down and into the gap between the two domes 3 in the direction in which the domes are free to rotate. If the cleat includes the embodiment having elliptical collars 22 and spring loaded collarpieces 23, the user may wish to adjust for the diameter of the line by loosening or tightening the set screw 26 which allows more or less "play" between the domes. At the same time if the cleat includes the tightening head 8 and washer 6, 15 embodiment, the user may wish to adjust the tension level above which the domes 3 may slip backwards on the washers 6, 15 by loosening or tightening the heads 8.

Once the above adjustments have been made the sailor may use the cleat 1 in sailing his or her boat. As it becomes necessary to draw in the line, the line is drawn between the rotating domes 3; the line-engaging surfaces 4 and the ratchet 17 and the pawl 18 assemblies preventing the line from being withdrawn. If the cleat includes the tightening head embodiment, limited line slippage is permitted by backward sliding of the domes 3 on the washers 6 and 15 when the preset tension level is exceeded. In any event, whenever it becomes necessary to release the line the user need only lift the line up and out from between the line engaging surfaces 4 of the domes 3. The procedure can be repeated with my cleat as often as it is necessary to secure the line from the sailing sheet of the boat.

What I claim is:

1. A cleat for securing a line, which cleat comprises:
   (a) a base plate;
   (b) a pair of first and second dome elements, each element characterized by a high friction line engaging surface, the first and second dome elements spaced apart and adapted to receive and hold a line placed between the dome elements;
   (c) first and second shaft means to connect the first and second dome elements, respectively, to the base plate; and
   (d) ratchet means connected to each of the shaft means to permit each of the shaft means to rotate in only one direction whereby a line which is secured between the dome elements can be drawn through the dome elements in a forward direction but will hold against tension applied in a reverse direction.

2. The cleat of claim 1 wherein the domed surfaces are characterized by spiral, grooved surfaces.

3. The cleat of claim 1 wherein the cleat further comprises means to permit limited line slippage in the reverse direction.

4. A cleat for securing a line so that the line may be drawn through the cleat in a forward direction and have adjustable, controlled slippage in a reverse direction, the cleat comprising:
   (a) a base plate having non-circular elongate collar holes;
   (b) first and second shafts passing through the first and second collar holes respectively, said shafts each having a shank portion projecting through the base plate and a shoulder portion and a post portion above the base plate;
   (c) a first rotatable, domed element having a high-friction surface, the high-friction surface being formed by spiralling grooves, and which first domed surface surrounds the post portion and sits upon the shoulder portion of the first shaft above the base plate;
   (d) a second rotatable, domed element having a high-friction surface, the high-friction surface being formed by spiralling grooves which spiral in the opposite direction to the grooves of the first domed surface, and which second domed surface surrounds the post portion and sits upon the shoulder portion of the second shaft above the base plate;
   (e) first and second ratchet wheels, each having a plurality of teeth, which wheels are fixedly secured to the first and second shafts, respectively, below the base plate, such that each wheel rotates with each shaft;
   (f) first and second spring-biased pawls which are pivotably mounted to the base plate and which engage the teeth of the first and second wheels, respectively, to permit rotation in one direction only, the pawls as well as the teeth of each wheel being so arranged that the shafts only rotate in opposing directions;
   (g) first and second cap means secured to the post portions of the first and second shafts respectively whereby the first and second dome elements are pressed between the respective cap means and the respective shoulder portions of the shafts;
   (h) a plurality of washers, the washers being situated both between the cap means and the domed elements and between the shoulder portion of the shaft and the dome elements, such that the washers may permit the dome elements to slip in the reverse direction without wear being occasioned upon the dome elements;
   (i) first and second tightening means to adjust the degree to which line slippage in the reverse direction is permitted, the first and second tightening means operating by tightening or loosening the first and second cap means respectively, which cap means compresses the dome elements and the washers against the shaft shoulder, thus making slippage more difficult or less difficult by adjustment; and
   (j) first and second spring means which urge the first and second shafts, respectively, towards those ends of the collar holes where the shafts will be nearest each other, and where the shafts hence, the dome elements are in a close, but noncontacting relationship, whereby the dome elements may be spread apart by overcoming the tension of the spring means, thus allowing easy insertion of the line and adjustment for differing line diameters.

5. A cleat for securing a line, which cleat comprises:
   (a) a base plate;
   (b) a pair of first and second dome elements, each dome element characterized by a high friction line engaging surface, the first and second dome elements spaced apart and adapted to receive and hold a line placed therebetween;
   (c) first and second shaft means to connect the first and second dome elements respectively, to the base plate, each shaft means having a shoulder portion adapted so that at least part of the dome element associated therewith rides thereon;
   (d) means to permit each of the shaft means to rotate in only one direction whereby a line which is secured between the dome elements can be drawn through the dome elements in a forward direction but will hold against tension applied in a reverse direction;
   (e) means to permit controlled line slippage in the reverse direction, said slippage-controlling means comprising a cap means secured to each shaft whereby the dome elements are not directly secured to each shaft, but rather are held between the cap means and the shoulder of the shaft, such that the dome elements may slip in the reverse direction even though the shafts are secured against reverse rotation.

6. The cleat of claim 5 wherein the means to permit controlled line slippage further comprises a means to adjust the degree to which line slippage in the reverse direction is permitted, the adjustment means operating by tightening or loosening the cap means which presses the domed surfaces against the shaft, thus making slippage more difficult or less difficult by adjustment.

7. The cleat of claim 5 wherein the means to permit controlled line slippage further comprises means to insure that a slippage tension level, once set, is maintained over continued use.

8. The cleat of claim 5 wherein the cleat further comprises a means to permit easy insertion of lines and provide an adjustment for different diameter lines, the means comprising:
  (a) first and second non-circular elongate collars formed in the base plate and through which the respective shafts pass; and
  (b) first and second spring means which urge the respective shafts towards those ends of the collars where the shafts will be nearest to each other and where the shafts, and hence, the domed elements and their line engaging surfaces are in a close but noncontacting relationship, whereby the domed elements may be spread apart by overcoming the tension of the spring means, thus allowing easy insertion of the line and adjustment for differing line diameters.

9. A cleat for securing a line which cleat comprises:
  (a) a base plate;
  (b) a pair of first and second dome elements, each dome element characterized by a high friction line engaging surface, the first and second dome elements spaced apart and adapted to receive and hold a line placed between the dome elements;
  (c) first and second shaft means for connecting the first and second dome elements, respectively, to the base plate; and
  (d) ratchet means for permitting each of the shaft means to rotate in only one direction, said ratchet means comprising:
    i. first and second ratchet wheels, each having a plurality of teeth, which wheels are fixedly secured to the respective shafts, such that the wheels may rotate with the first and second shafts respectively; and
    ii. first and second pawls which are mounted on the base plate and engage the teeth of the respective wheels to permit rotation in one direction only, the pawls as well as the teeth of each wheel being so arranged that the shaft means may only rotate in opposing directions.

10. The cleat of claim 5 wherein the means to permit controlled line slippage further comprises a plurality of washers situated between each domed element and both its adjacent cap means and its shaft, means such that the washers permit the domed elements to slip in the reverse direction without wear being occasioned upon the domed elements.

11. The cleat of claim 5 wherein the base plate has two non-circular, elongate collar holes, through which the respective shaft means pass and wherein the cleat further comprises first and second spring means which urge the respective shaft towards each other whereby the shaft means may be spread apart by overcoming the tension of the spring means thus allowing easy insertion of the line and adjustment for differing line diameters.

12. The cleat of claim 9 wherein the base plate has two non-circular, elongate collar holes, through which the respective shaft means pass and wherein the cleat further comprises first and second spring means which urge the respective shaft towards each other whereby the shaft means may be spread apart by overcoming the tension of the spring means thus allowing easy insertion of the line and adjustment for differing line diameters.

* * * * *